United States Patent
Swan et al.

(10) Patent No.: US 10,649,158 B2
(45) Date of Patent: May 12, 2020

(54) ALIGNMENT OF SINGLE AND MULTI-MODE OPTICAL FIBERS USING PIEZOELECTRIC ACTUATORS

(71) Applicant: Intel Corporation, Santa Clara, CA (US)

(72) Inventors: Johanna M. Swan, Scottsdale, AZ (US); Aleksandar Aleksov, Chandler, AZ (US); Sasha N. Oster, Chandler, AZ (US); Feras Eid, Chandler, AZ (US); Baris Bicen, Chandler, AZ (US); Thomas L. Sounart, Chandler, AZ (US); Shawna M. Liff, Scottsdale, AZ (US); Valluri R. Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/098,406

(22) PCT Filed: Jul. 1, 2016

(86) PCT No.: PCT/US2016/040871
§ 371 (c)(1),
(2) Date: Nov. 1, 2018

(87) PCT Pub. No.: WO2018/004696
PCT Pub. Date: Jan. 4, 2018

(65) Prior Publication Data
US 2019/0121038 A1   Apr. 25, 2019

(51) Int. Cl.
*G02B 6/42* (2006.01)
*G02B 6/36* (2006.01)

(52) U.S. Cl.
CPC ............ *G02B 6/4226* (2013.01); *G02B 6/366* (2013.01)

(58) Field of Classification Search
CPC ................................ G02B 6/4226; G02B 6/366
(Continued)

(56) References Cited

U.S. PATENT DOCUMENTS

| 6,408,120 B1 * | 6/2002 | Dautartas | G02B 6/3512 |
| | | | 385/18 |
| 2002/0141684 A1 * | 10/2002 | Hsu | G02B 6/3508 |
| | | | 385/16 |

(Continued)

FOREIGN PATENT DOCUMENTS

| JP | 2806410 | 9/1998 |
| JP | 2000-249936 | 9/2000 |
| JP | 3237728 | 12/2001 |

OTHER PUBLICATIONS

International Search Report and Written Opinion for International Patent Application No. PCT/US2016/040871 dated Jan. 17, 2017, 13 pgs.

(Continued)

*Primary Examiner* — Jerry M Blevins
(74) *Attorney, Agent, or Firm* — Schwabe, Williamson & Wyatt, P.C.

(57) ABSTRACT

Embodiments of the invention include an optoelectronic package that allows for in situ alignment of optical fibers. In an embodiment, the optoelectronic package may include an organic substrate. Embodiments include a cavity formed into the organic substrate. Additionally, the optoelectronic package may include an actuator formed on the organic substrate that extends over the cavity. In one embodiment, the actuator may include a first electrode, a piezoelectric layer formed on the first electrode, and a second electrode formed on the piezoelectric layer. According to an additional embodiment of the invention, the actuator may include a first portion and a second portion. In order to allow for resistive heating and actuation driven by thermal expansion, a cross- (Continued)

sectional area of the first portion of the beam may be greater than a cross-sectional area of the second portion of the beam.

21 Claims, 8 Drawing Sheets

(58) Field of Classification Search
USPC .......................................................... 385/52
See application file for complete search history.

(56) References Cited

U.S. PATENT DOCUMENTS

2006/0262378 A1* 11/2006 Machida ............ G02B 26/0858
359/290
2011/0123150 A1    5/2011 Zbinden et al.
2016/0238805 A1*  8/2016 McColloch .......... G02B 6/4268

OTHER PUBLICATIONS

International Preliminary Report on Patentability for International Application No. PCT/US2016/040871 dated Jan. 10, 2019, 10 pgs.

* cited by examiner

ALIGNMENT OF SINGLE AND MULTI-MODE OPTICAL FIBERS USING PIEZOELECTRIC ACTUATORS

CROSS-REFERENCE TO RELATED APPLICATION

This patent application is a U.S. National Phase Application under 35 U.S.C. § 371 of International Application No. PCT/US2016/040871, filed Jul. 1, 2016, entitled "ALIGNMENT OF SINGLE AND MULTI-MODE OPTICAL FIBERS USING PIEZOELECTRIC ACTUATORS," which designates the United States of America, the entire disclosure of which is hereby incorporated by reference in its entirety and for all purposes.

FIELD OF THE INVENTION

Embodiments of the present invention relate generally to the manufacture of optoelectronic packages with adjustable fiber optic blocks. In particular, embodiments of the present invention relate to piezoelectric actuators that are used to adjust the position of a fiber block in optoelectronic packages and methods for manufacturing such devices.

BACKGROUND OF THE INVENTION

Optoelectronic packages include an optical engine that is mounted on a package substrate. The optical engine may include a light source (e.g., lasers, light emitting diodes (LEDs), silicon photonics, etc.) and/or photodetectors. Currently available optoelectronic packages generally include an optical engine that is cantilevered over an edge of the package substrate so that transmitting and/or receiving optical fibers may be aligned and coupled with the optical engine.

Figure 1:
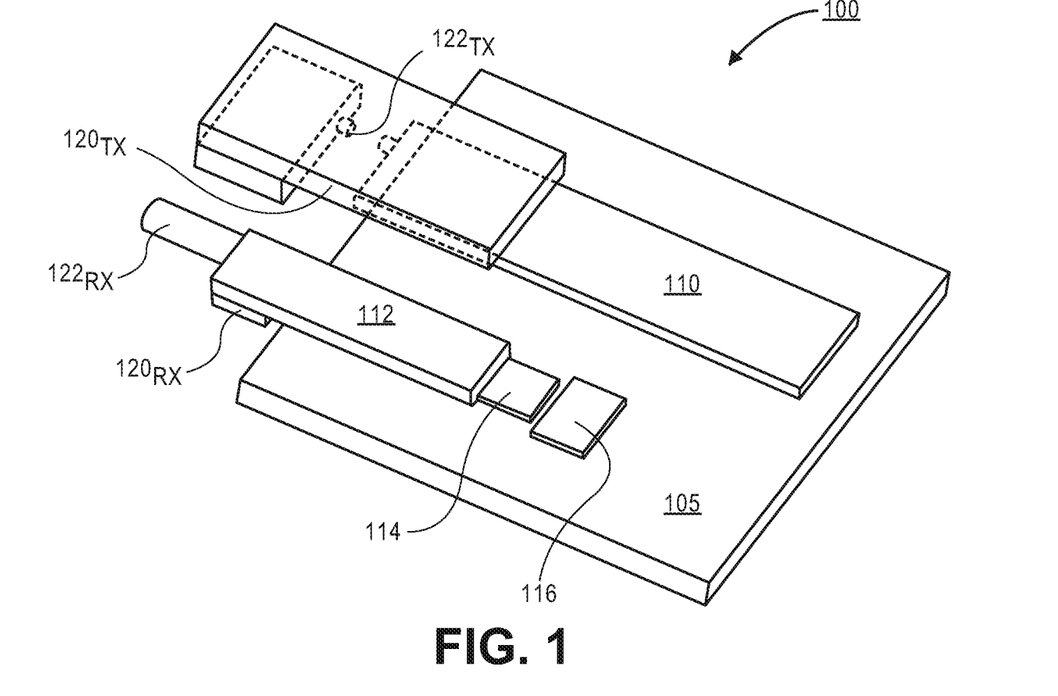
FIG. 1 is a perspective view of an optoelectronic package with a cantilevered optical engine.

An exemplary illustration of an optoelectronic package 100 is shown in FIG. 1. As illustrated, the optoelectronic package 100 includes a transmit (Tx) line 110 and a receive (Rx) line 112. The Tx line 110 and the Rx line 112 are represented as blocks, but it is to be appreciated that the lines may each include optical fibers for routing transmitted or received optical signals to or from light sources or photodetectors. Additionally, the Tx line 110 and Rx line 112 may provide multiplexing or demultiplexing functionalities. In FIG. 1, a photodetector 114 is shown at the end of the Rx line 112. Additionally, an integrated circuit 116 for controlling the optical engine may also be mounted to the substrate 105. As illustrated, the fiber block $120_{Tx}$ that includes the Tx fiber $122_{Tx}$ may be mounted to the portion of the optical engine that is cantilevered over the edge of the substrate 105. Similarly, the Rx fiber $122_{Rx}$ may pass through a fiber block $120_{Rx}$ and be mounted to a portion of the optical engine that is cantilevered over the edge of the substrate 105. While not illustrated in order to not obscure the Figure, it is to be appreciated that the fiber blocks 120 and the optical engine may be secured together with an epoxy in order to prevent movement.

Optical fibers that are employed in optoelectronic packages and systems today require precise alignment. For example, single mode fibers typically have an 8-10.5 μm core size and require alignment on the order of ±1 μm. The optical fibers may pass through a fiber block that may be aligned with the optical engine and fixed in place with an epoxy. Once the desired alignment is achieved, the epoxy is cured and the fiber block is locked in place.

However, after assembly and during use, the alignment of the fibers may shift for a multitude of reasons such as, thermal drift, physical handling, or external sources of vibration coupling into the system. As the alignment shifts, the system degrades and may no longer be operable at the required data rates. Since the fiber block is secured to the package with a cured epoxy, misalignment requires removing the optical system from the package or board and actively realigning the fiber block and reapplying and curing epoxy. Furthermore, cantilevering the Tx and Rx lines 110, 112 over the edge of the substrate 105 induces stress in the optical fibers. Stress in the optical fibers leads to stress induced losses of the optical signal, thereby further reducing the efficiency of the device.

DETAILED DESCRIPTION OF THE INVENTION

Described herein are systems that include an optoelectronic package with an adjustable fiber block and methods of forming such optoelectronic packages. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As described above, previous optoelectronic packages included a cured epoxy to permanently secure the fiber block to the package once the optical fibers were properly aligned. Accordingly, in situ realignment of the optical fibers is not possible. In contrast, embodiments of the present invention allow for in situ realignment of the optical fibers by using one or more actuators that are formed on, or mounted to, the package substrate. When alignment between an optical fiber and the optical engine falls below a desired threshold, the one or more actuators may be activated in order to realign the optical fibers. For example, the actuators may include piezoelectric actuators, actuators driven by thermal expansion, or the like. Additionally, the actuators may be integrated into the substrate and formed in conjunction with the fabrication of the package substrate. Alternative embodiments may include actuators that are discrete devices that are surface mounted to the package substrate. Embodiments of the invention may also include one or more adjustable hard-stops that are able to semi-permanently secure the fiber block after aligning the optical fibers without needing to be constantly supplied with power. For example, the adjustable hard-stops may include linear motors. As such, power does not need to be continuously applied to the actuators in order to maintain the alignment of the optical fibers. Furthermore, embodiments of the invention allow for the optical connection between the optical fibers and the optical engine to be located within the footprint of the substrate on which the optical engine is formed. As such, there is no need to cantilever a portion of the optical engine over an edge of the substrate, thereby reducing the stress in the optical fibers.

Figure 2A:
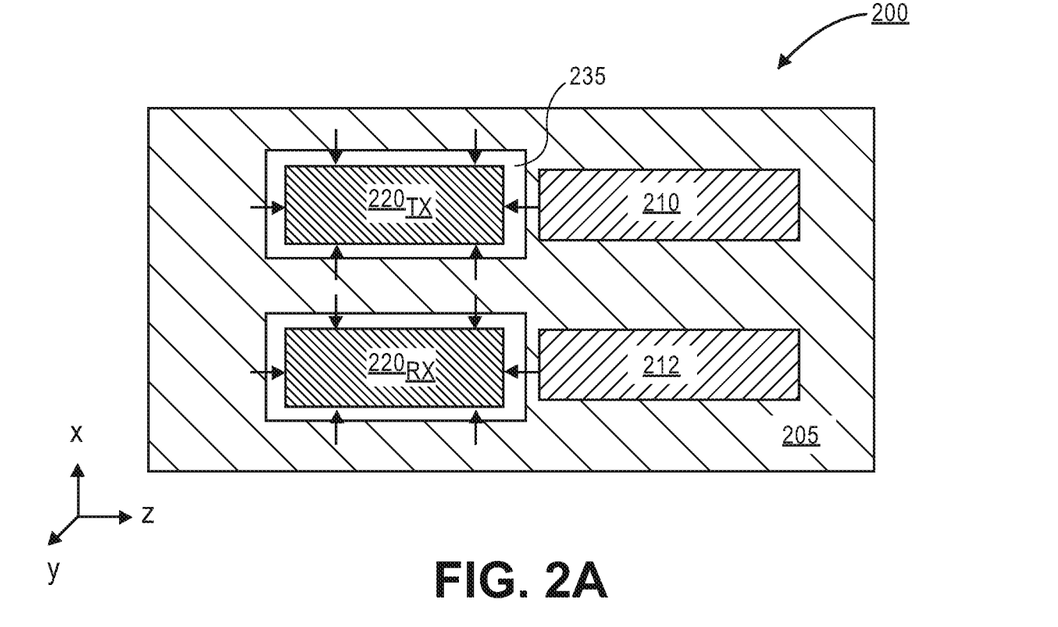
FIG. 2A is a schematic block diagram of an optoelectronic package with adjustable fiber blocks, according to an embodiment of the invention.

Referring now to FIG. 2A, a schematic block diagram of an optoelectronic package 200 is shown, according to an embodiment of the invention. In the illustrated embodiment, a Tx line 210 and a Rx line 212 are shown as blocks formed on the surface of a substrate 205. However, it is to be appreciated that the Tx line 210 and the Rx line 212 may include any number of components, including optical fibers, multiplexers, demultiplexers, light sources, photodetectors, integrated circuitry for controlling the optical engine, or any other desired components. Furthermore, it is to be appreciated that the optical engine may be embedded within the substrate 205. In one embodiment, the substrate 205 may be any suitable package substrate, board, or the like. By way of example, the substrate 205 may be an organic material, such as, for example, polyimide, epoxy, or build-up film. The substrate 205 may include one or more layers (i.e., build-up layers). According to an embodiment, the substrate 205 may also include one or more conductive traces, vias, and pads (not shown) to provide electrical routing in the substrate 205. The conductive traces, vias, and pads may be any suitable conductive material typically used in organic packaging applications (e.g., copper, tin, aluminum, alloys of conductive materials, and may also include multiple layers, such as seed layers, barrier layers, or the like).

In an embodiment, a Tx fiber block $220_{Tx}$ and an Rx fiber block $220_{Rx}$ are placed in cavities 235 formed into the substrate 205. While shown as rectangular shapes in FIG. 2, it is to be appreciated that the fiber blocks 220 are not limited to such shapes. Furthermore, it is to be appreciated that each fiber block 220 may include one or more optical fibers (not shown in FIG. 2) that pass through the fiber block 220. For example, each fiber block 220 may include one optical fiber or an array of optical fibers. As such, each fiber block 220 may be used to align one or more optical fibers to the Tx line 210 or Rx line 212.

According to an embodiment, each cavity 235 may have a perimeter that is greater than a perimeter of the fiber block 220 placed in the cavity 235. As such, the fiber block 220 is not permanently constrained by sidewalls of the cavity 235. The cavity 235 may be used to set the gross alignment between the fiber blocks 220 and the Tx line 210 and Rx line 212. After gross alignment is set by the cavity 235, one or more actuators may be used to displace the fiber block 220 within the cavity 235 in order to provide the desired alignment. For example, a plurality of actuators may be formed around the perimeter of the cavity in order to displace the fiber block 220 in the X-direction and Z-direction. According to an embodiment of the invention, multiple actuators may also be used simultaneously to enable rotation of the fiber block 220 in the plane of the substrate. Arrows are shown in FIG. 2 to illustrate exemplary locations of where the actuators may contact the fiber block 220, though this is not a limiting example. Additional embodiments may include any number of actuators located at any location to provide the desired displacement of the fiber block 220. Additionally, one or more actuators may be formed on the bottom surface of the cavity to enable displacement in the Y-direction (out of the plane of the substrate 205). Accordingly, the one or more actuators may be used to adjust the position of the fiber block in the X, Y, and/or Z directions to ensure proper alignment between the optical fibers and the optical engine.

According to an embodiment, when the alignment is degraded (e.g., due to thermal changes, mechanical shock events, vibrations, etc.) the actuators may be used to displace the fiber block 220 without needing to remove the fiber block from the substrate. A more detailed explanation of the structure and actuation mechanism of the actuators is described in greater detail below. Furthermore, the optical coupling between the optical fiber 222 and the optical fiber 211 of the Tx line 210 does not require cantilevering a portion of the optical engine over an edge of the substrate 205, since the fiber block 210 is placed in a cavity 235 within the footprint of the substrate 205. Accordingly, stress induced losses are minimized compared to previous optoelectronic engines described above.

Figure 2B:
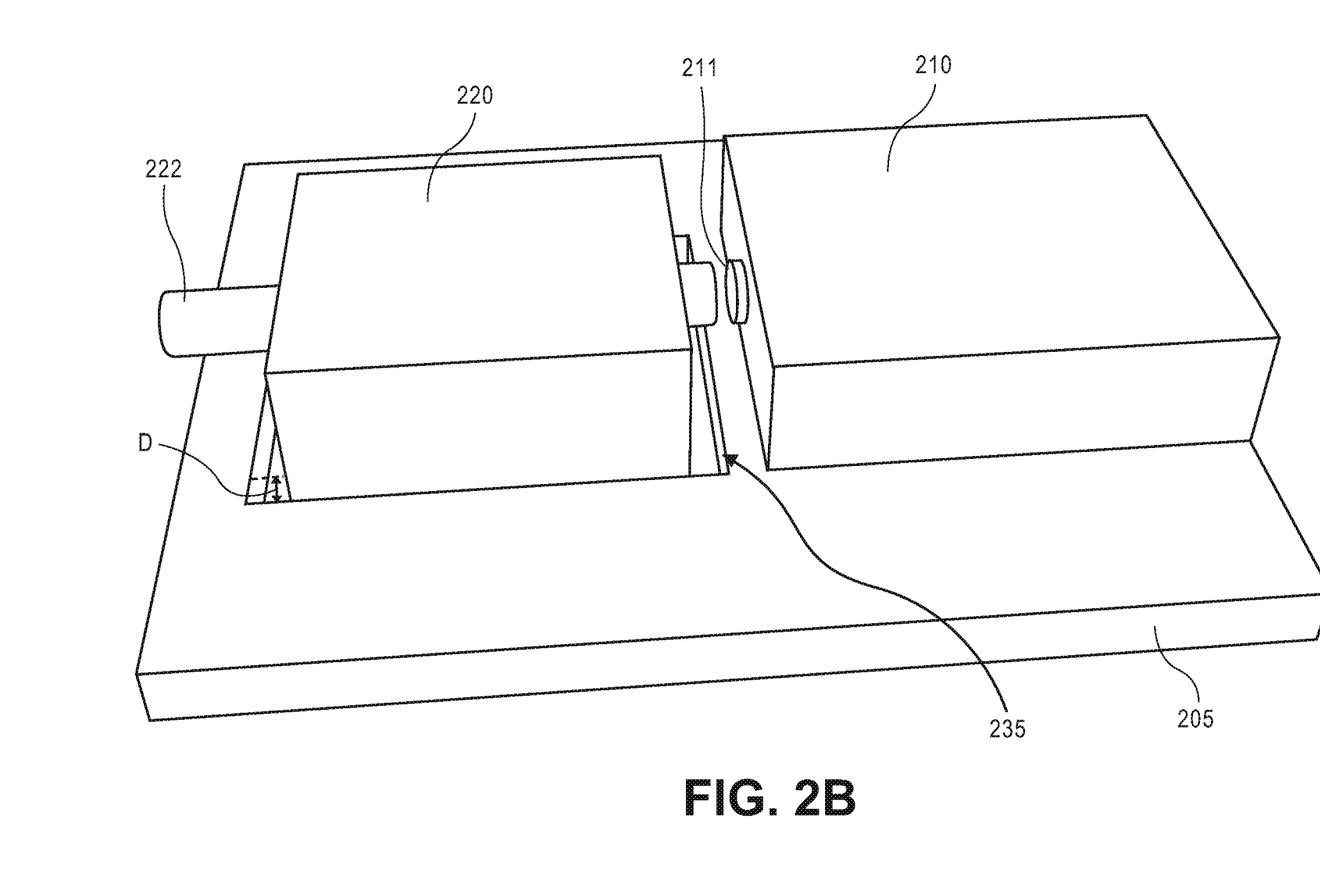
FIG. 2B is a perspective view illustration of a portion of an optoelectronic package with a fiber block placed in a cavity formed into the substrate, according to an embodiment of the invention.

Referring now to FIG. 2B, a perspective view of a fiber block 220 and a Tx line 210 positioned on a substrate 205 is shown, according to an embodiment of the invention. In FIG. 2B, the actuators are omitted for simplicity in order to illustrate the relationship between the fiber block 220 and the Tx line 210. While a Tx line 210 is shown in FIG. 2B, it is to be appreciated that an Rx line may be aligned with a fiber block 220 in a substantially similar manner. As illustrated, the fiber block 220 may be placed in a cavity 235 in the substrate 205. According to an embodiment, the fiber block 220 may be sized so that sidewalls are spaced away from the edges of the cavity 235. The spacing between the edges of the cavity 235 and the sidewalls of the fiber block 220 allows for the fiber block 220 to be displaced within the cavity 235. For example, the spacing may be between approximately 5 µm and 50 µm, however, additional embodiments may include spacings that are greater or smaller depending on the needs of the device. According to an additional embodiment, the depth D of the cavity may be chosen such that a centerline of the optical fiber 222 that passes through the fiber block 220 is aligned with a centerline of an optical fiber 211 formed through the Tx line 210 in the Y-direction. As such, the alignment in the Y-direction may utilize quasi-kinematic coupling in the package to pre-set the Y-height of the optical fiber 222, thereby eliminating the need for actuation in the Y-direction.

Figure 3A:
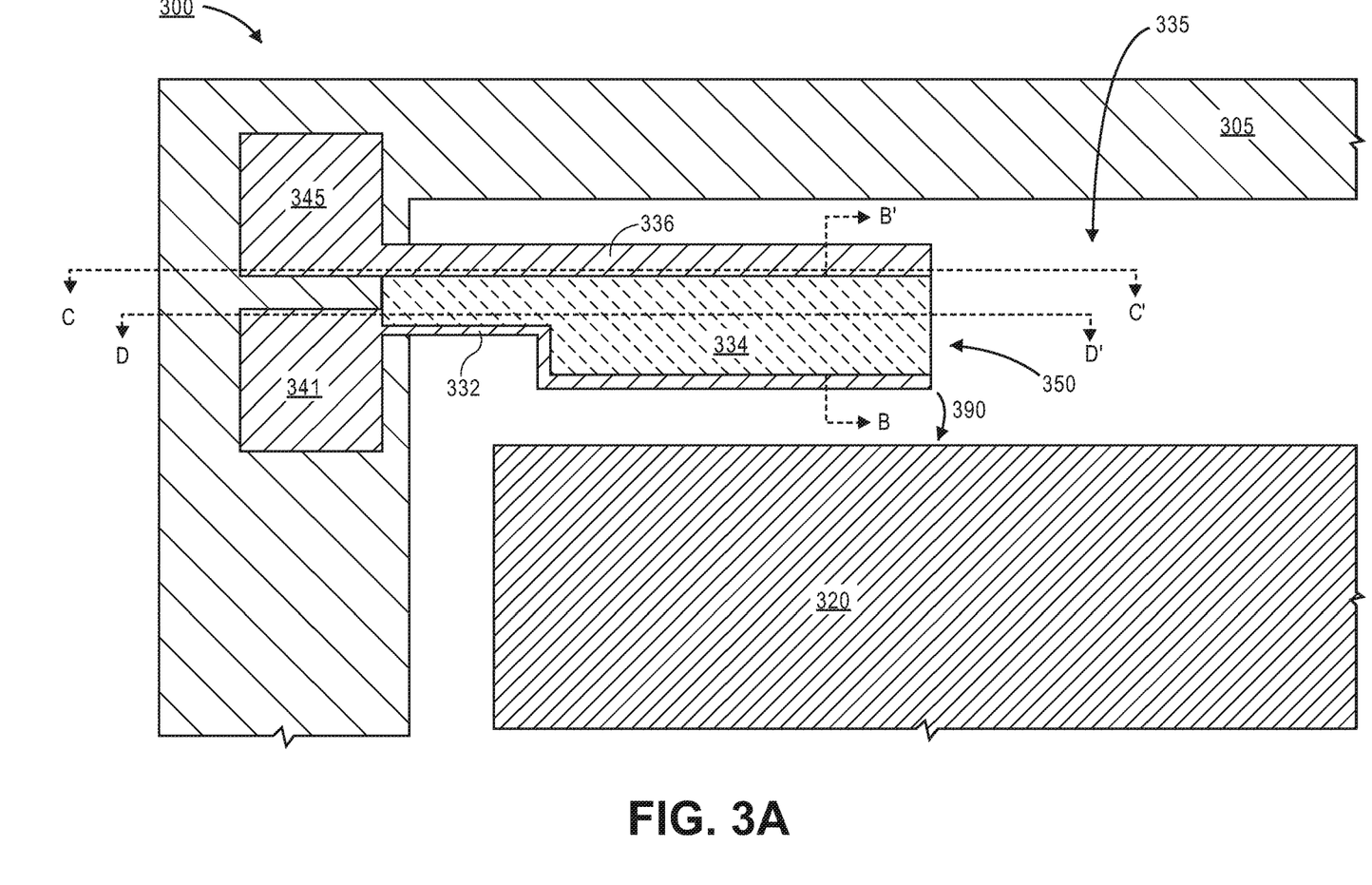
FIG. 3A is a plan view illustration of a piezoelectric actuator, according to an embodiment of the invention.

Referring now to FIG. 3A, a plan view illustration of an actuator 350 that may be used to displace the fiber block 320 is shown, according to an embodiment of the invention. In an embodiment, the actuator 350 may be a piezoelectric actuator 350 that is actuatable in the plane of the substrate 305, as illustrated by arrow 390. Accordingly, the actuator 350 may be deflected so that it contacts a surface of the fiber block 320 and results in displacing the fiber block 320. In an embodiment of the invention, the actuator 350 may include a first electrode 332 and a second electrode 336 that is separated from the first electrode 332 by a piezoelectric material 334. In order to provide deflection in the plane of the substrate 305, the first electrode 332 and the second electrode 336 may be formed along opposing sidewall surfaces of the piezoelectric material 334. In such embodiments, applying a voltage across the piezoelectric material 334 may result in the piezoelectric material 334 deflecting towards the fiber block 320. Additionally, a non-uniform cross-section of the piezoelectric material 334 may be used to enhance the amount of deflection attainable by the actuator 350.

In order to provide free movement of the actuator 350, the actuator 350 may be oriented so that the first and second electrodes 332, 336 and the piezoelectric material 334 form a beam that extends over the cavity 335 formed in the substrate 305. Since the beam is not constrained from below by the substrate 305, the beam is free to move when the piezoelectric material 334 is strained when a voltage differential is applied between the first electrode 332 and the second electrode 336. According to an additional embodiment, the actuator 350 may also be embedded within the substrate 305. In such an embodiment, the actuator 350 may be anchored to the substrate 305 and extend out from a sidewall of the cavity 335. An embedded actuator 350 may be fabricated in one layer and be surrounded by sacrificial materials or utilize pre-fabrication lamination techniques in order to maintain void space integrity and enable mechanical motion without friction or jamming when the actuator is embedded within the substrate 305.

While an actuator 350 is only shown in a single layer in FIG. 3A, it is to be appreciated that actuators may be formed in multiple layers of the substrate 305, according to additional embodiments of the invention. For example, two or more actuators 350 may be stacked over each other in different layers. The combined strength of stacked actuators 350 may allow for an increased actuation force, thereby allowing for the displacement of a more massive fiber block 320.

According to an embodiment, the first electrode 332 and the second electrode 336 may be anchored to the to the substrate 305 by a first anchor 341 and a second anchor 345, respectively. The first and second anchors 341, 345 may electrically couple the first and second electrodes 332, 336 to a voltage source (not shown). As such, a voltage differential across the first electrode 332 and the second electrode 336 may be generated. The voltage applied across the first electrode 332 and the second electrode 336 induces a strain in the piezoelectric layer 334 that causes displacement of the actuator 350. In an embodiment, the displacement of the actuator 350 is proportional to the voltage across the first electrode 332 and the second electrode 336.

In an embodiment, the amount of deflection is limited by the plastic deformation of the first and second electrodes 332, 336 (i.e., the deflection may be up to the point where the deformation regime of the actuator changes from elastic deformation to plastic deformation). Since the displacement of the actuator 350 is proportional to the voltage applied to the first and second electrodes 332, 336, the fiber block 320 may be displaced in an analog manner to different positions in order to allow for precise alignment of the optical fibers in the fiber block 320.

According to an embodiment, the first electrode 332 and the second electrode 336 are formed with a conductive material. In some embodiments, the first electrode 332 and the second electrode 336 may be formed with the same conductive material used to form the conductive traces, vias, and pads formed in the substrate 305. Such an embodiment allows for the manufacture of optoelectronic package 300 to be simplified since additional materials are not needed, though embodiments are not limited to such configurations. For example, the electrodes 332, 336 may be different materials than the traces. Additional embodiments may include a first electrode 332 that is a different material than the second electrode 336. The conductive material used for the first electrode 332 and the second electrode 336 may be any conductive material (e.g., copper, aluminum, alloys, etc.).

In order to provide sufficient force to displace the fiber block 320, embodiments of the invention include a high performance piezoelectric material for the piezoelectric layer 334. For example, the high performance piezoelectric layer 334 may be lead zirconate titanate (PZT), potassium sodium niobate (KNN), zinc oxide (ZnO), aluminum nitride (AlN), or combinations thereof. High performance piezoelectric materials such as these typically require a high temperature anneal (e.g., greater than 500° C.) in order to attain the proper crystal structure to provide the piezoelectric effect. As such, currently available piezoelectric actuators require a substrate that is capable of withstanding high temperatures (e.g., silicon). Low melting temperatures substrates described herein, such as organic substrates, typically cannot withstand temperatures above 260° C. However, embodiments of the present invention allow for a piezoelectric layer 334 to be formed at much lower temperatures. For example, instead of a high temperature anneal, embodiments include depositing the piezoelectric layer 334 in an amorphous phase and then using a pulsed laser to crystalize the piezoelectric layer 334. For example, the piezo-electric layer 334 may be deposited with a sputtering process, an ink jetting process, or the like. According to an embodiment, the pulsed laser annealing process may use an excimer laser with an energy density between approximately 10-100 mJ/cm$^2$ and a pulsewidth between approximately 10-50 nanoseconds. Utilizing such an annealing process allows for the high performance piezoelectric layer 334 to be formed without damaging the substrate 305 on which the actuator 350 is formed.

Figure 3B:
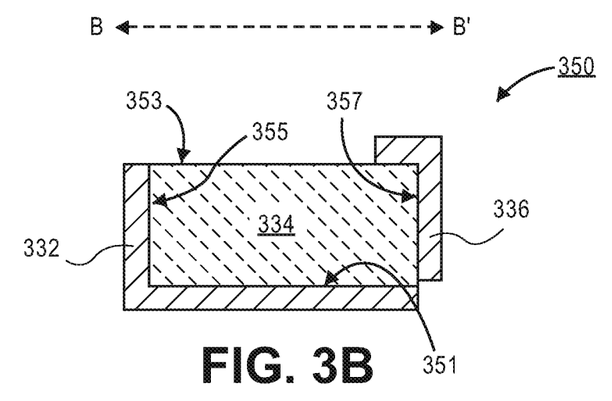
FIG. 3B is a cross-sectional illustration of the piezoelectric actuator, according to an embodiment of the invention.

Referring now to FIG. 3B, a cross-sectional illustration of a portion of the actuator 350 along line B-B' is shown, according to an embodiment of the invention. The cross-sectional view provides an example of how the piezoelectric layer 334 is supported between the first electrode 332 and the second electrode 336. In order to allow for actuation in the plane of the substrate 305, portions of the first electrode 332 are formed along a first sidewall 355 of the piezoelectric material 334 and portions of the second electrode 336 are formed along a second sidewall 357 that is opposite the first sidewall 355. In some embodiments, a portion of the first electrode 332 may be formed below a bottom surface 351 of the piezoelectric material 334. The portion of the first electrode 332 below the piezoelectric material 334 provides a support structure that may be used as a surface on which the piezoelectric material 334 is deposited during the formation of the actuator 350. In some embodiments, an insulative material (not shown) may be deposited over the portion of the first electrode 332 in order to provide an electrical field primarily oriented in the horizontal plane. Similarly, an insulative layer (not shown) may be formed over a top surface 353 of the piezoelectric material 334 in order to prevent portions of the second electrode 336 from contacting the piezoelectric material 334.

Figure 3C:
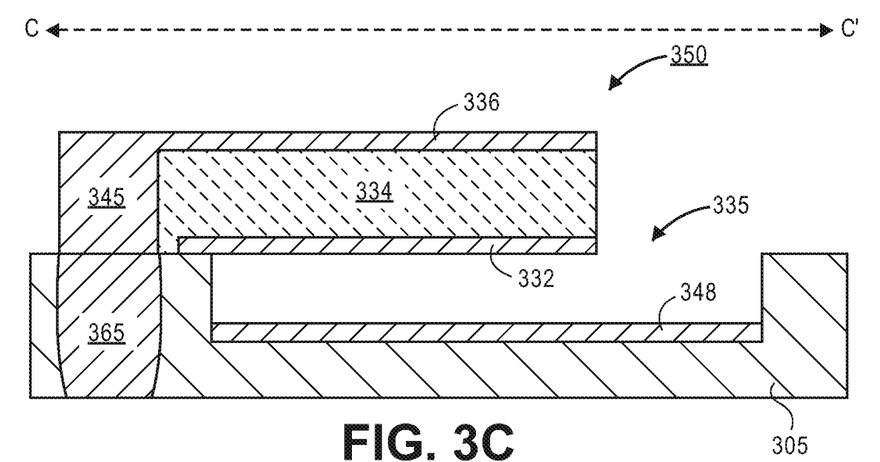
FIG. 3C is a cross-sectional illustration along the length of one of the electrodes of the piezoelectric actuator, according to an embodiment of the invention.
Figure 3D:
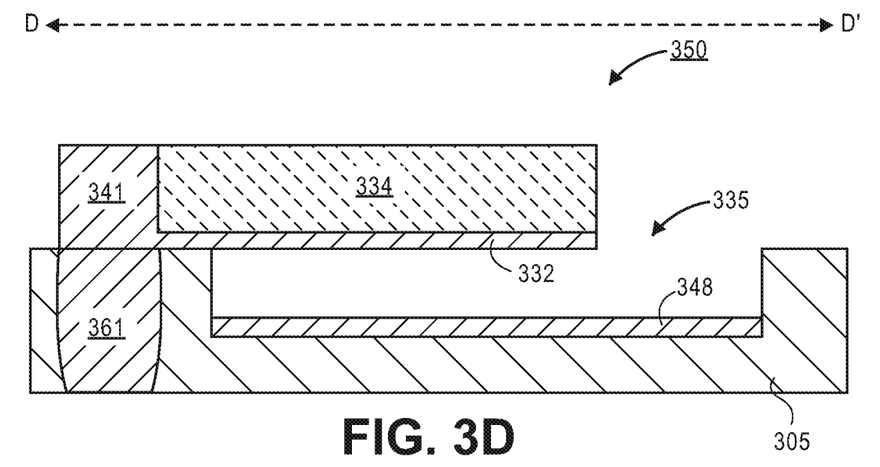
FIG. 3D is a cross-sectional illustration along the length of another electrode of the piezoelectric actuator, according to an embodiment of the invention.

Referring now to FIGS. 3C and 3D, cross-sectional illustrations of portions of the actuator 350 are shown along lines C-C' and D-D', respectively, according to an embodiment of the invention. In FIG. 3C the cross-section illustrates a portion of the second electrode 336 formed over a top surface of the piezoelectric material 334 and electrically coupled to the second anchor 345. The second anchor 345 may also be coupled to pads, traces, and/or vias 365 formed in or on the substrate 305. In the illustrated embodiment, the second anchor 345 and the via 365 are illustrated as distinct regions, however embodiments are not limited to such configurations. For example, there may not be a discernable difference between the second anchor 345 and the vias 365. Additionally, the first electrode 332 is shown supporting the piezoelectric material 334 from below. According to an embodiment, the first electrode 332 may be electrically isolated from the second electrode 336 and the second anchor 345 by a portion of the piezoelectric material 334 that is formed over a surface of the substrate 305. Alternative embodiments may also include an insulative material (not shown) being formed between the first electrode 332 and the second electrode 336 and the second anchor 345.

Referring now to FIG. 3D, the cross-sectional illustration shows the connection between the first electrode 332 and the first anchor 341. According to an embodiment, the first electrode 332 extends substantially along the entire length of the piezoelectric material 334 in order to provide a surface on which the piezoelectric material 334 may be deposited.

Additionally, as illustrated in FIGS. 3C and 3D, an etchstop layer 348 may be formed at the bottom surface of the cavity 335, according to some embodiments of the invention. An etchstop layer 348 may be used to enable a controlled etching process that provides a precise and uniform depth for the cavity 335. The precise and uniform control of the depth of the cavity 335 provided by an etchstop layer 348 allows for embodiments of the invention to utilize quasi-kinematic alignment of the fiber block in the vertical direction, as described above. In an embodiment, the etchstop layer 348 may be any suitable material that is resistant to an etching process used to form the cavity 335. For example, the etchstop layer 348 may be the same material as the electrodes or other conductive features formed in the substrate 305.

While a piezoelectric actuator is described above, embodiments are not limited to such configurations. For example, some embodiments may also include actuators that are driven by thermal expansion. An example of such an actuator is illustrated and descried with respect to FIGS. 4A and 4B.

Figure 4A:
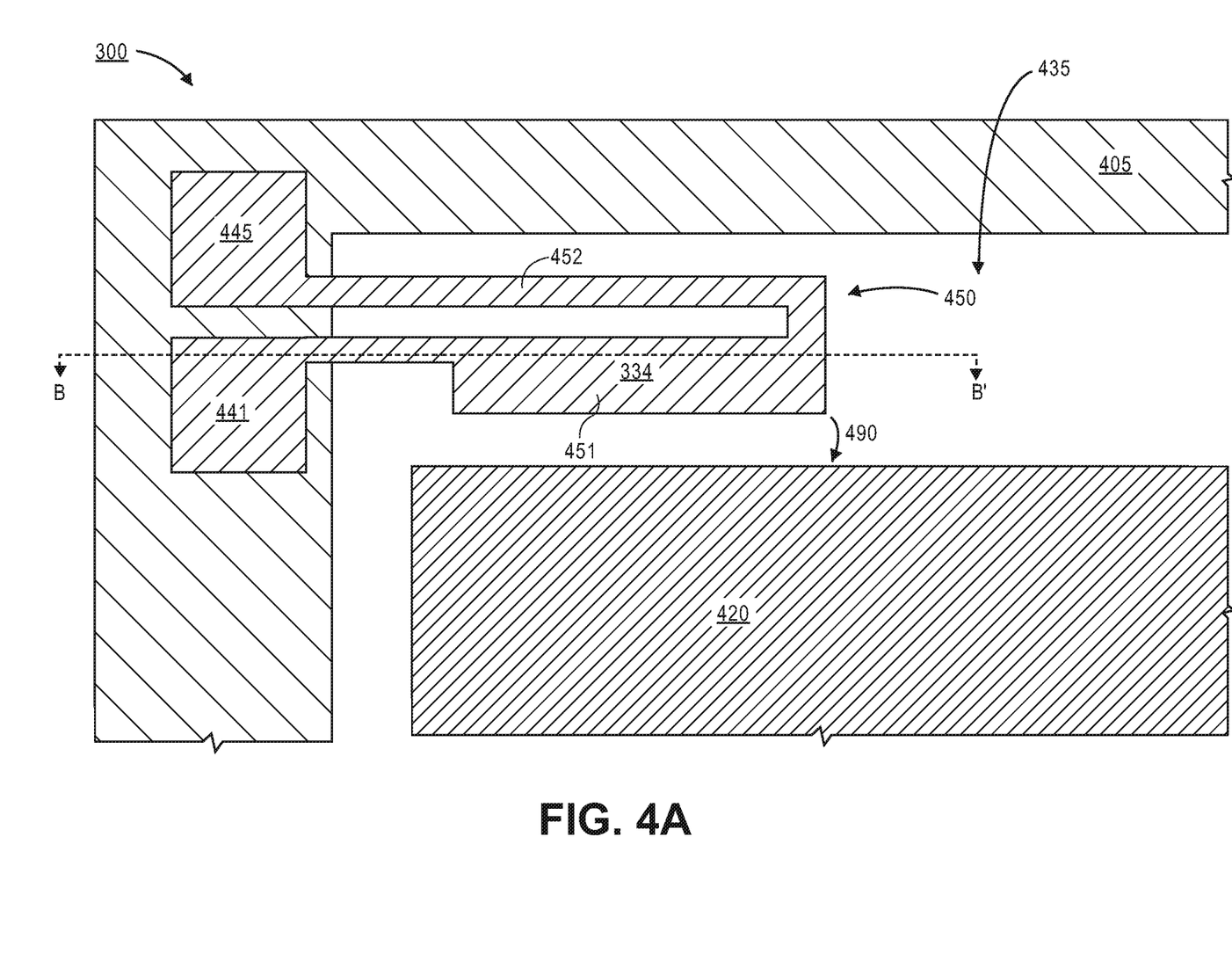
FIG. 4A is a plan view illustration of an actuator driven by thermal expansion, according to an embodiment of the invention.
Figure 4B:
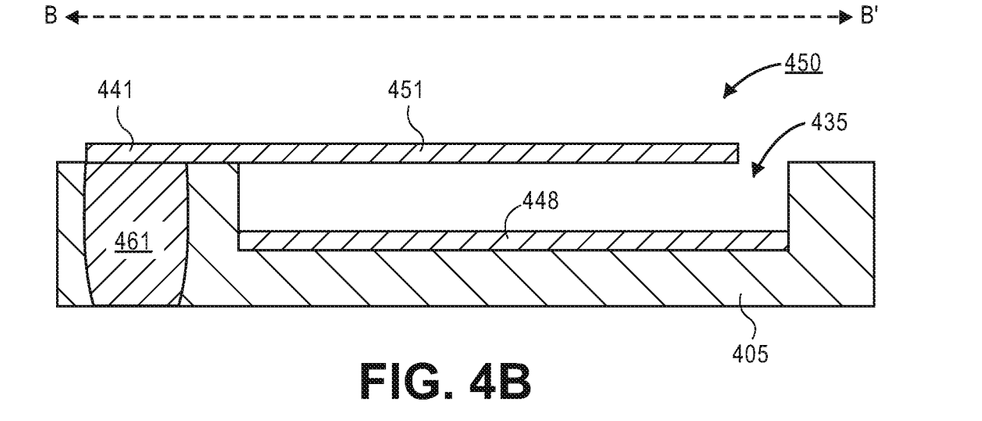
FIG. 4B is a cross-sectional illustration of the actuator illustrated in FIG. 4A, according to an embodiment of the invention.

Referring now to FIGS. 4A and 4B, a plan view illustration and a corresponding cross-sectional illustration along line B-B' of an actuator are shown, according to an additional embodiment of the invention. In order to provide free movement of the actuator 450, the actuator 450 may be oriented so that a first portion 451 and a second portion 452 of the actuator 450 extend over the cavity 435 formed in the substrate 405. Since the first portion 451 and the second portion 452 are not constrained from below by the substrate 405, the actuator 450 is free to move when the current is supplied. According to an additional embodiment, the actuator 450 may also be embedded within the substrate 405. In such an embodiment, the actuator 450 may be anchored to the substrate 405 and the first portion 451 and the second portion 452 may extend out from a sidewall of the cavity 435. An embedded actuator 450 may be fabricated in one layer and be surrounded by sacrificial materials or utilize pre-fabrication lamination techniques in order to maintain void space integrity and enable mechanical motion without friction or jamming when the actuator 450 is embedded within the substrate 405.

While an actuator 450 is only shown in a single layer in FIG. 4A, it is to be appreciated that actuators may be formed in multiple layers of the substrate 405, according to additional embodiments of the invention. For example, two or more actuators 450 may be stacked over each other in different layers. The combined strength of stacked actuators 450 may allow for an increased actuation force, thereby allowing for the displacement of a more massive fiber block 420.

According to an embodiment, the first portion 451 of the beam and the second portion 452 of the beam may be anchored to the to the substrate 405 by a first anchor 441 and a second anchor 445, respectively. The first and second anchors 441, 445 may electrically couple the actuator 450 to a power source (not shown). As such, an electrical current may pass through the first portion 451 and second portion 452 of the actuator 450.

Instead of relying on piezoelectric actuation, the actuator 450 may rely on temperature differences between a first portion 451 and a second portion 452 of actuator 450 in order to provide actuation. Specifically, resistive heating occurs as current passes through the first portion 451 and second portion 452 of the actuator 450. According to an embodiment, the change in temperature of each portion is controlled by changing the cross-sectional area of each portion of the actuator 450. For example, the first portion 451 may have a larger cross-sectional area than the second portion 452. Accordingly, the second portion 452 will experience a greater increase in temperature than the first portion 451, thereby resulting in greater thermal expansion. The greater thermal expansion in the second portion 452 causes the beam to deflect towards the fiber block 420 as indicated by arrow 490. According to an embodiment, analog control of the actuator 450 may be obtained by varying the amount of current that passes through the actuator 450.

In FIG. 4B, the cross-sectional illustration shows the connection of the actuator 450 to an anchor 441. The anchor 441 may be substantially similar to the anchors 341/345 described above. Accordingly, the anchor 441 may include vias 461 formed into the substrate 405 that are electrically coupled to an electrical circuit that allows for current to pass through the first and second portions 451, 452 of the actuator 450. Additionally, since actuator 450 does not need to support a piezoelectric layer or provide electrical contact to sidewalls of a piezoelectric layer, the thickness of the first portion 451 and the second portion 452 may be substantially uniform.

Additionally, an etchstop layer 448 may be formed at the bottom surface of the cavity 435, according to some embodiments of the invention. An etchstop layer 448 may be used to enable a controlled etching process that provides a precise and uniform depth. The precise and uniform control of the depth of the cavity 435 provided by an etchstop layer 448 allows for embodiments of the invention to utilize quasi-kinematic alignment of the fiber block in the vertical direction, as described above.

In addition to bimorph actuators, such as those described above, embodiments of the invention may also use any other type of actuator that may be mounted on or integrated into the package substrate. For example, FIGS. 5A and 5B, are cross-sectional illustrations of a piezoelectrically driven cymbal that may be used to displace the fiber block, according to an embodiment of the invention.

Figure 5A:
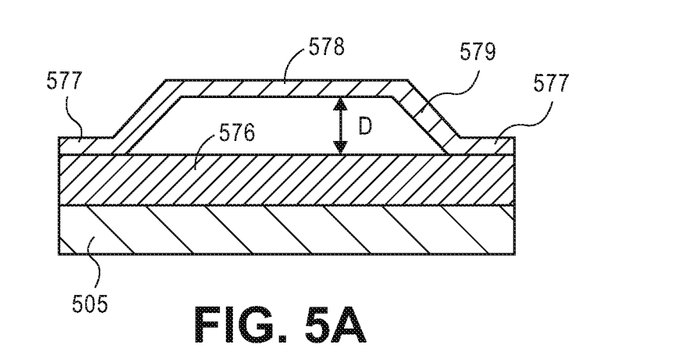
FIG. 5A is a cross-sectional illustration of an additional piezoelectric actuator that may be used to align a fiber block, according to an embodiment of the invention.
Figure 5B:
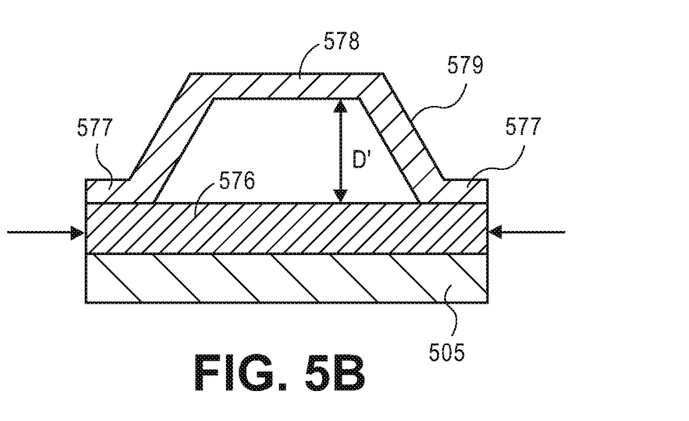
FIG. 5B is a cross-sectional illustration of the piezoelectric actuator of FIG. 5A in an actuated state, according to an embodiment of the invention.

FIG. 5A illustrates an unactuated cymbal 579. According to an embodiment, the cymbal 579 may be a layer that includes contact portions 577 that contact a piezoelectric layer 576 and a raised portion 578 formed between the contact portions 577 that is spaced away from the piezoelectric layer 576. In an embodiment, the spacing between the piezoelectric layer 576 and the raised portion 577 of the cymbal 579 may be formed by depositing the cymbal 579 over a sacrificial material that is removable after the cymbal 579 is formed.

In order to change the spacing between the raised portion 578 of the cymbal 579 and the piezoelectric layer 576, the piezoelectric layer 576 may be contracted or expanded. For example, in FIG. 5B the arrows indicate that the piezoelectric layer 576 is contracted. As a result, the distance D' may be greater than the distance D in the unactuated state illustrated in FIG. 5A.

The deflection of the cymbal may be controlled by providing a voltage to the piezoelectric layer 576. The piezoelectric layer 576 responds to the voltage by being strained in an amount proportional to the voltage applied. As such, varying the voltage allows for the amount of deflection to be accurately controlled and enables analog control of the displacement of the fiber block. Additionally, it is to be appreciated that the cymbal 579 allows for small strains in the piezoelectric layer 576 to be amplified, thereby providing larger displacements. Actuators, such as the one illustrated in FIGS. 5A and 5B, may be integrated into the walls of the cavity, along the floor of the cavity, and/or on any other surface of the substrate 505 in order to provide actuation of the fiber block in the X, Y, and/or Z directions.

The above examples describe systems where the displacement of the actuators takes place upon energizing the piezoelectric layers or exposing a bimorph to a current. However, in some embodiments, power to the actuators is limited (or undesired) once alignment is achieved. In such embodiments, one or more linear motors may be employed on the package to hold the fiber block in place and effectively be used as a hard-stop. According to an embodiment, these motors may then be adjusted in concert with the actuators when realignment of the fiber block is needed.

Figure 6:
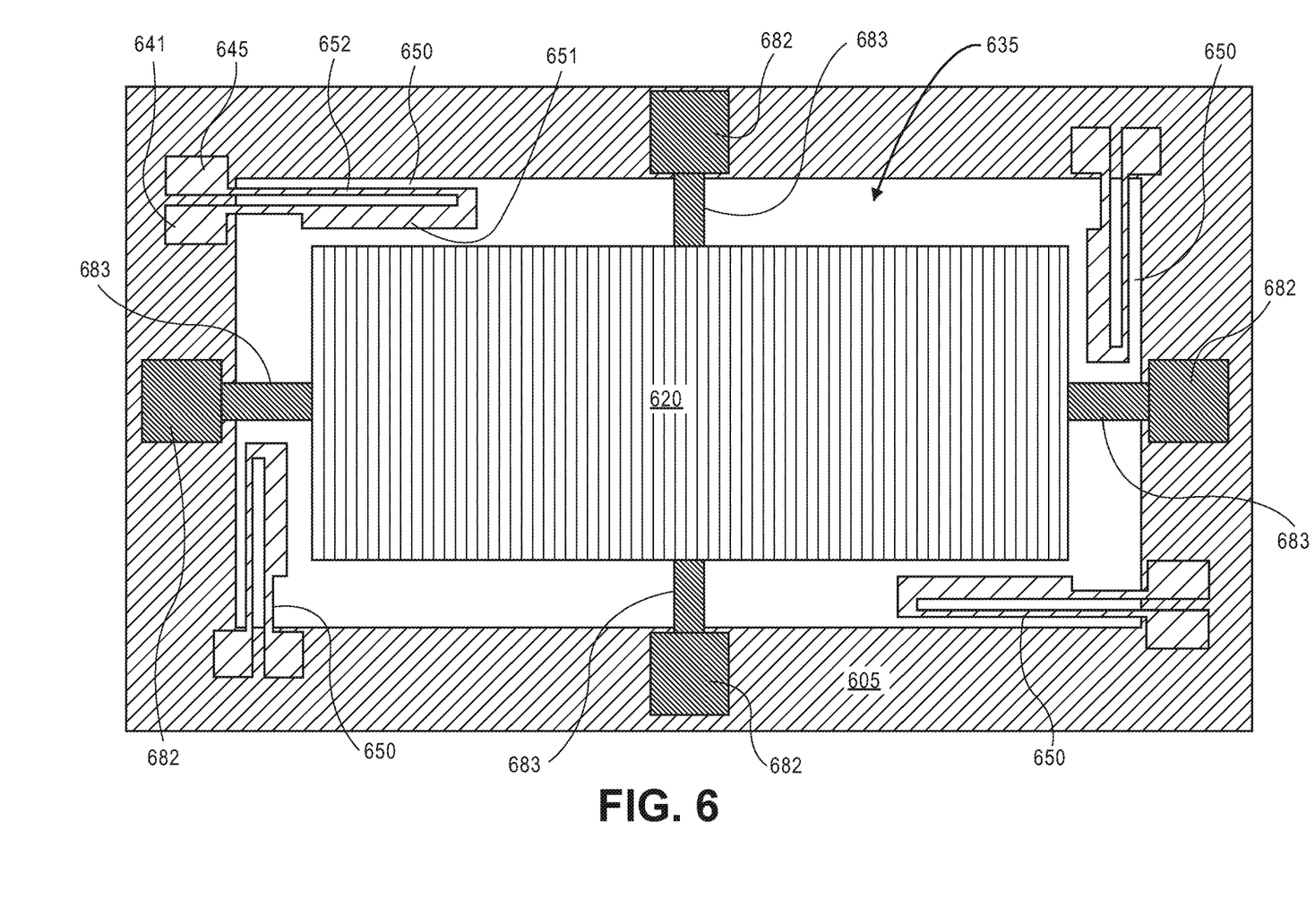
FIG. 6 is a plan view illustration of a portion of an optoelectronic package with actuators and linear motor hard-stops, according to an embodiment of the invention.

Referring now to FIG. 6, a plan view illustration of a fiber block 620 that is secured by pins 683 of linear motors 682 is shown, according to an embodiment of the invention. In an embodiment, one or more linear motors 682 may be located around the perimeter of the cavity 635. In the illustrated embodiment, the linear motors 682 are located along a top surface of the substrate 605, however embodiments are not limited to such configurations. For example, the linear motors 682 may be embedded within the substrate 605, and the pins 683 may extend out from the sidewall of the cavity 635. Embodiments of the invention include linear motors 682 such as, piezoelectrically driven linear motors, electro-mechanical linear motors, or the like.

One benefit to using linear motors 682 as a hard-stop is that the linear motors may not require a constant power supply to maintain the position of the pins 683. For example, power may be supplied to the linear motors 682 as the pins 683 are extended or retracted, and once the pins 683 are at the desired position, no additional power needs to be applied to maintain the position. Accordingly, the fiber block 620 may be securely aligned without needing to continuously apply power to the actuators 650. In contrast, previous optoelectronic packages required cured epoxy to secure the fiber blocks 620. As such, in situ alignment was not possible, and the optoelectronic package needed to be reworked or replaced when alignment fell below a desired threshold.

In an embodiment, the actuators 650 may have been used to align a fiber in the fiber block 620 with an optical engine, and then the linear motors 682 extend pins 683 out from the sidewalls of the cavity in order to contact and secure the fiber block. Additional embodiments may include extending the pins 683 of the linear motors 682 concurrently with the displacement of the actuators 650. In order to readjust the fiber block 620, embodiments of the invention may include retracting the pins 683 of one or more of the linear motors 682 from the fiber block 620 prior to, or during, the displacement of the actuators 650.

In addition to the embodiments described above where each of the actuators used for displacing the fiber blocks are integrated into the substrate as part of the substrate manufacturing process, embodiments of the invention may also utilize discrete actuators that are surface mounted to the substrate or embedded within the substrate. For example, surface mounted actuators may be mounted around the perimeter of the cavity and electrically coupled to a power source. In such embodiments, the manufacturing process may be simplified since additional patterning and etching operations used to form the actuators may be omitted. According to an embodiment, discrete actuators may include piezoelectric actuators, electro-mechanical actuators, or the like.

Figure 7:
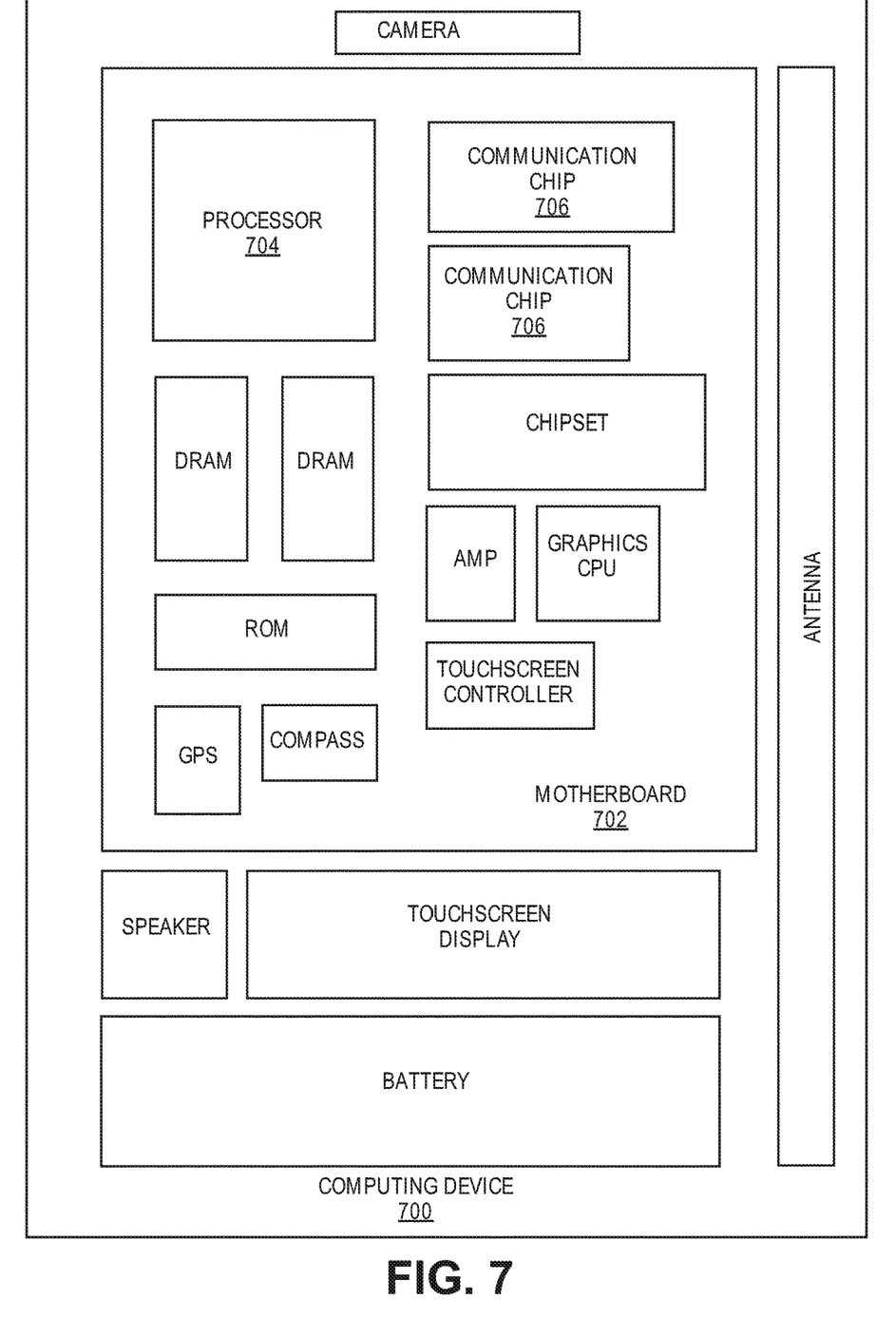
FIG. 7 is a schematic of a computing device built in accordance with an embodiment of the invention.

FIG. 7 illustrates a computing device 700 in accordance with one implementation of the invention. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. In some implementations of the invention, the integrated circuit die of the processor may be packaged on an organic substrate and provide signals for actuating one or more piezoelectric actuators used to align a fiber block, in accordance with implementations of the invention. The term "processor" may refer to any device or portion of a device that processes electronic data from registers and/or memory to transform that electronic data into other electronic data that may be stored in registers and/or memory.

The communication chip 706 also includes an integrated circuit die packaged within the communication chip 706. In accordance with another implementation of the invention, the integrated circuit die of the communication chip may be packaged on an organic substrate and provide signals for actuating one or more piezoelectric actuators used to align a fiber block, in accordance with implementations of the invention.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Embodiments of the invention include an optoelectronic package, comprising: an organic substrate; a cavity formed into the organic substrate; and an actuator formed on the organic substrate and extending over the cavity, wherein the actuator comprises: a first electrode; a piezoelectric layer formed on the first electrode; and a second electrode formed on the piezoelectric layer.

Additional embodiments of the invention include an optoelectronic package, wherein the first electrode is formed below the piezoelectric layer and along a first sidewall of the piezoelectric layer, and wherein the second electrode is formed along a second sidewall of the piezoelectric layer that is opposite to the first sidewall.

Additional embodiments of the invention include an optoelectronic package, wherein the first electrode and the second electrode are electrically coupled to anchors on the organic substrate.

Additional embodiments of the invention include an optoelectronic package, wherein the second electrode is also formed over a portion of a top surface of the piezoelectric layer.

Additional embodiments of the invention include an optoelectronic package, wherein the actuator extends out from a sidewall of the cavity.

Additional embodiments of the invention include an optoelectronic package, further comprising a second actuator formed above the first actuator and separated from the first actuator by a layer of the substrate.

Additional embodiments of the invention include an optoelectronic package, further comprising: a fiber block positioned in the cavity, wherein one or more optical fibers pass through the fiber block.

Additional embodiments of the invention include an optoelectronic package, wherein the actuator contacts a sidewall of the fiber block when actuated.

Additional embodiments of the invention include an optoelectronic package, further comprising a plurality of actuators formed around the perimeter of the cavity, wherein each of the actuators contacts a sidewall of the fiber block when actuated.

Additional embodiments of the invention include an optoelectronic package, wherein the plurality of actuators are actuatable to displace the fiber block within the cavity.

Additional embodiments of the invention include an optoelectronic package, further comprising: an optical engine mounted proximate to the cavity, wherein one or more of the optical fibers are optically coupled to the optical engine.

Additional embodiments of the invention include an optoelectronic package, further comprising: one or more linear motors mounted to the substrate, wherein the linear motors are extendable towards the fiber block.

Additional embodiments of the invention include an optoelectronic package, wherein the linear motors are electromotors or piezoelectric motors.

Additional embodiments of the invention include an optoelectronic package, wherein the piezoelectric layer is lead zirconate titanate (PZT), potassium sodium niobate (KNN), zinc oxide (ZnO) and/or aluminum nitride (AlN).

Additional embodiments of the invention include an optoelectronic package, further comprising an etchstop layer formed on a bottom surface of the cavity.

Embodiments of the invention include an optoelectronic package comprising: an organic substrate; a cavity formed into the organic substrate; and a plurality of actuators formed around a perimeter of the cavity, wherein each of the actuators includes a beam that extends over the cavity.

Additional embodiments of the invention include an optoelectronic package, wherein the plurality of actuators are coupled to the substrate by anchors.

Additional embodiments of the invention include an optoelectronic package, wherein the beam of the plurality of actuators includes a first portion and a second portion, wherein a cross-sectional area of the first portion of the beam is greater than a cross-sectional area of the second portion of the beam.

Additional embodiments of the invention include an optoelectronic package, wherein the plurality of actuators comprise: a first electrode; a piezoelectric layer formed on the first electrode; and a second electrode formed on the piezoelectric layer.

Additional embodiments of the invention include an optoelectronic package, wherein the first electrode is formed below the piezoelectric layer and along a first sidewall of the piezoelectric layer, and wherein the second electrode is formed along a second sidewall of the piezoelectric layer that is opposite to the first sidewall.

Additional embodiments of the invention include an optoelectronic package, wherein the piezoelectric layer is lead zirconate titanate (PZT), potassium sodium niobate (KNN), zinc oxide (ZnO), and/or aluminum nitride (AlN).

Embodiments of the invention include an optoelectronic package, comprising: an organic substrate; a cavity formed in the organic substrate; a fiber block positioned in the cavity, wherein the fiber block includes one or more optical fibers; an optical engine formed on the organic substrate, wherein the optical engine includes transmission and/or receiving lines, each having a centerline that is aligned to the same height as one of the optical fibers; and a plurality of actuators formed around a perimeter of the cavity, wherein each of the actuators includes a beam that extends over the cavity, and wherein the plurality of actuators contact a sidewall of the fiber block when actuated.

Additional embodiments of the invention include an optoelectronic package, further comprising: one or more linear motors coupled to the substrate, wherein the linear motors are extendable towards the fiber block.

Additional embodiments of the invention include an optoelectronic package, wherein the plurality of actuators each comprise: a first electrode; a piezoelectric layer formed on the first electrode; and a second electrode formed on the piezoelectric layer, wherein the first electrode is formed below the piezoelectric layer and along a first sidewall of the piezoelectric layer, and wherein the second electrode is formed along a second sidewall of the piezoelectric layer that is opposite to the first sidewall.

Additional embodiments of the invention include an optoelectronic package, wherein the piezoelectric layer is lead zirconate titanate (PZT), potassium sodium niobate (KNN), zinc oxide (ZnO), and/or aluminum nitride (AlN).

What is claimed is:

1. An optoelectronic package, comprising:
   an organic substrate;
   a cavity formed into the organic substrate; and
   an actuator formed on the organic substrate and extending over the cavity, wherein the actuator comprises:
      a first electrode;
      a piezoelectric layer formed on the first electrode; and
      a second electrode formed on the piezoelectric layer, and wherein the actuator is actuatable in a plane parallel to a top surface of the organic substrate, and wherein the first electrode is formed below the piezoelectric layer and along a first sidewall of the piezoelectric layer, and wherein the second electrode is formed along a second sidewall of the piezoelectric layer that is opposite to the first sidewall.

2. The optoelectronic package of claim 1, wherein the first electrode and the second electrode are electrically coupled to anchors on the organic substrate.

3. The optoelectronic package of claim 1, wherein the second electrode is also formed over a portion of a top surface of the piezoelectric layer.

4. The optoelectronic package of claim 1, wherein the actuator extends out from a sidewall of the cavity.

5. The optoelectronic package of claim 4, further comprising a second actuator formed above the first actuator and separated from the first actuator by a layer of the substrate.

6. The optoelectronic package of claim 1, further comprising:
   a fiber block positioned in the cavity, wherein one or more optical fibers pass through the fiber block.

7. The optoelectronic package of claim 6, wherein the actuator contacts a sidewall of the fiber block when actuated.

8. The optoelectronic package of claim 6, further comprising a plurality of actuators formed around the perimeter of the cavity, wherein each of the actuators contacts a sidewall of the fiber block when actuated.

9. The optoelectronic package of claim 8, wherein the plurality of actuators are actuatable to displace the fiber block within the cavity.

10. The optoelectronic package of claim 6, further comprising:
    an optical engine mounted proximate to the cavity, wherein one or more of the optical fibers are optically coupled to the optical engine.

11. The optoelectronic package of claim 6, further comprising:
    one or more linear motors mounted to the substrate, wherein the linear motors are extendable towards the fiber block.

12. The optoelectronic package of claim 11, wherein the linear motors are electro-motors or piezoelectric motors.

13. The optoelectronic package of claim 1, wherein the piezoelectric layer is lead zirconate titanate (PZT), potassium sodium niobate (KNN), zinc oxide (ZnO), and/or aluminum nitride (AlN).

14. The optoelectronic package of claim 1, further comprising an etchstop layer formed on a bottom surface of the cavity.

15. An optoelectronic package comprising:
    an organic substrate;
    a cavity formed into the organic substrate; and
    a plurality of actuators formed around a perimeter of the cavity, wherein each of the actuators includes a beam that extends over the cavity, and wherein the actuators are actuatable in a plane parallel to a top surface of the organic substrate, wherein the beam of each actuator comprises:
       a first electrode;
       a piezoelectric layer formed on the first electrode; and
       a second electrode formed on the piezoelectric layer, wherein the first electrode is formed below the piezoelectric layer and along a first sidewall of the piezoelectric layer, and wherein the second electrode is formed along a second sidewall of the piezoelectric layer that is opposite to the first sidewall.

16. The optoelectronic package of claim 15, wherein the plurality of actuators are coupled to the substrate by anchors.

17. The optoelectronic package of claim 15, wherein the piezoelectric layer is lead zirconate titanate (PZT), potassium sodium niobate (KNN), zinc oxide (ZnO), and/or aluminum nitride (AlN).

18. An optoelectronic package, comprising:
    an organic substrate;
    a cavity formed in the organic substrate;
    a fiber block positioned in the cavity, wherein the fiber block includes one or more optical fibers;
    an optical engine formed on the organic substrate, wherein the optical engine includes transmission and/or receiving lines, each having a centerline that is aligned to the same height as one of the optical fibers; and a plurality of actuators formed around a perimeter of the cavity, wherein each of the actuators includes a beam that extends over the cavity, and wherein the plurality of actuators contact a sidewall of the fiber block when actuated.

19. The optoelectronic package of claim 18, further comprising:

one or more linear motors coupled to the substrate, wherein the linear motors are extendable towards the fiber block.

20. The optoelectronic package of claim 18, wherein the plurality of actuators each comprise:

a first electrode;

a piezoelectric layer formed on the first electrode; and a second electrode formed on the piezoelectric layer, wherein the first electrode is formed below the piezoelectric layer and along a first sidewall of the piezoelectric layer, and wherein the second electrode is formed along a second sidewall of the piezoelectric layer that is opposite to the first sidewall.

21. The optoelectronic package of claim 20, wherein the piezoelectric layer is lead zirconate titanate (PZT), potassium sodium niobate (KNN), zinc oxide (ZnO), and/or aluminum nitride (AlN).

* * * * *